A. SZABODOS & H. MUELLER.
INDICATING AND ALARM MECHANISM FOR THE MOVEMENTS OF GASES IN MINES.
APPLICATION FILED JAN. 9, 1912.
1,064,869.
Patented June 17, 1913.
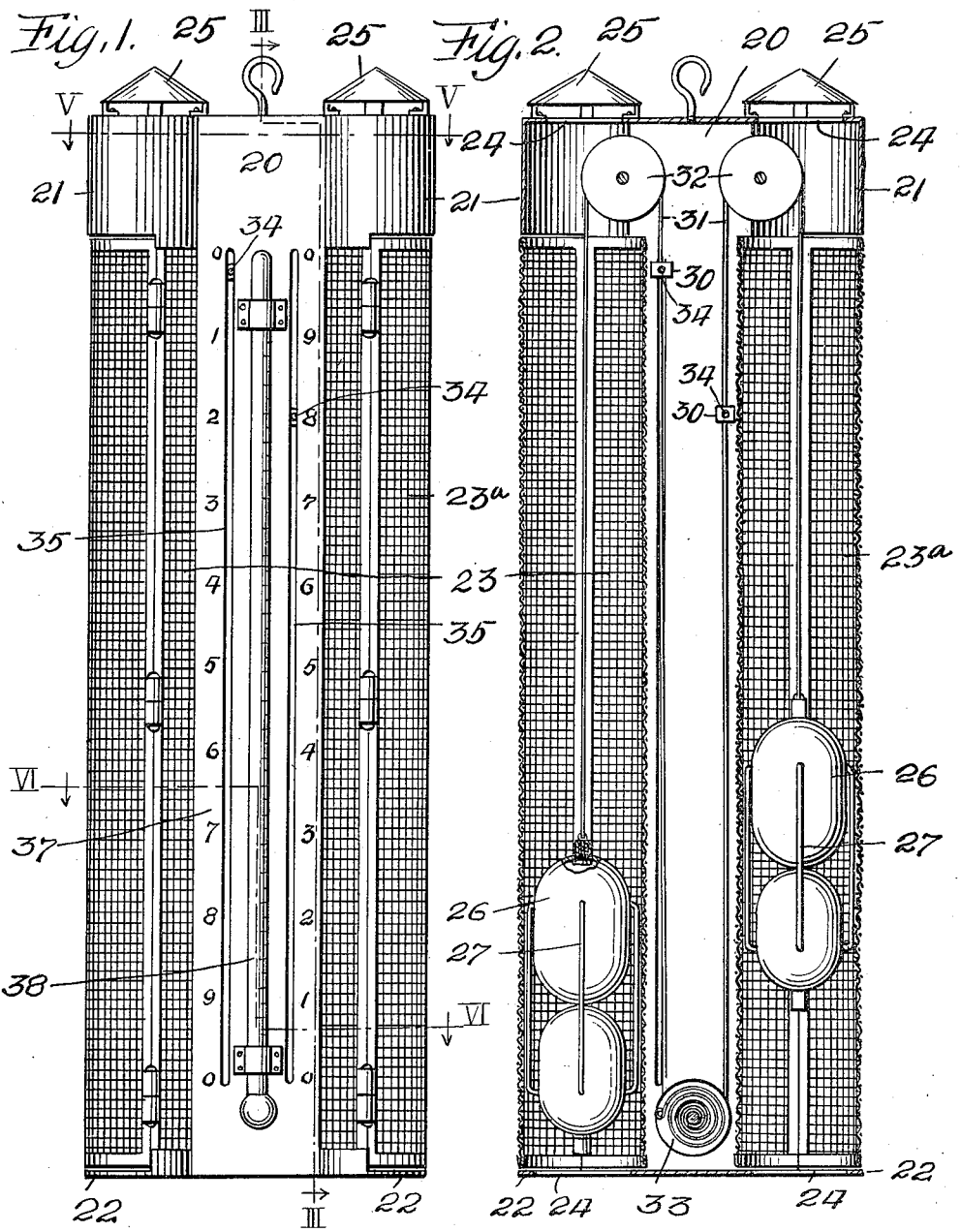

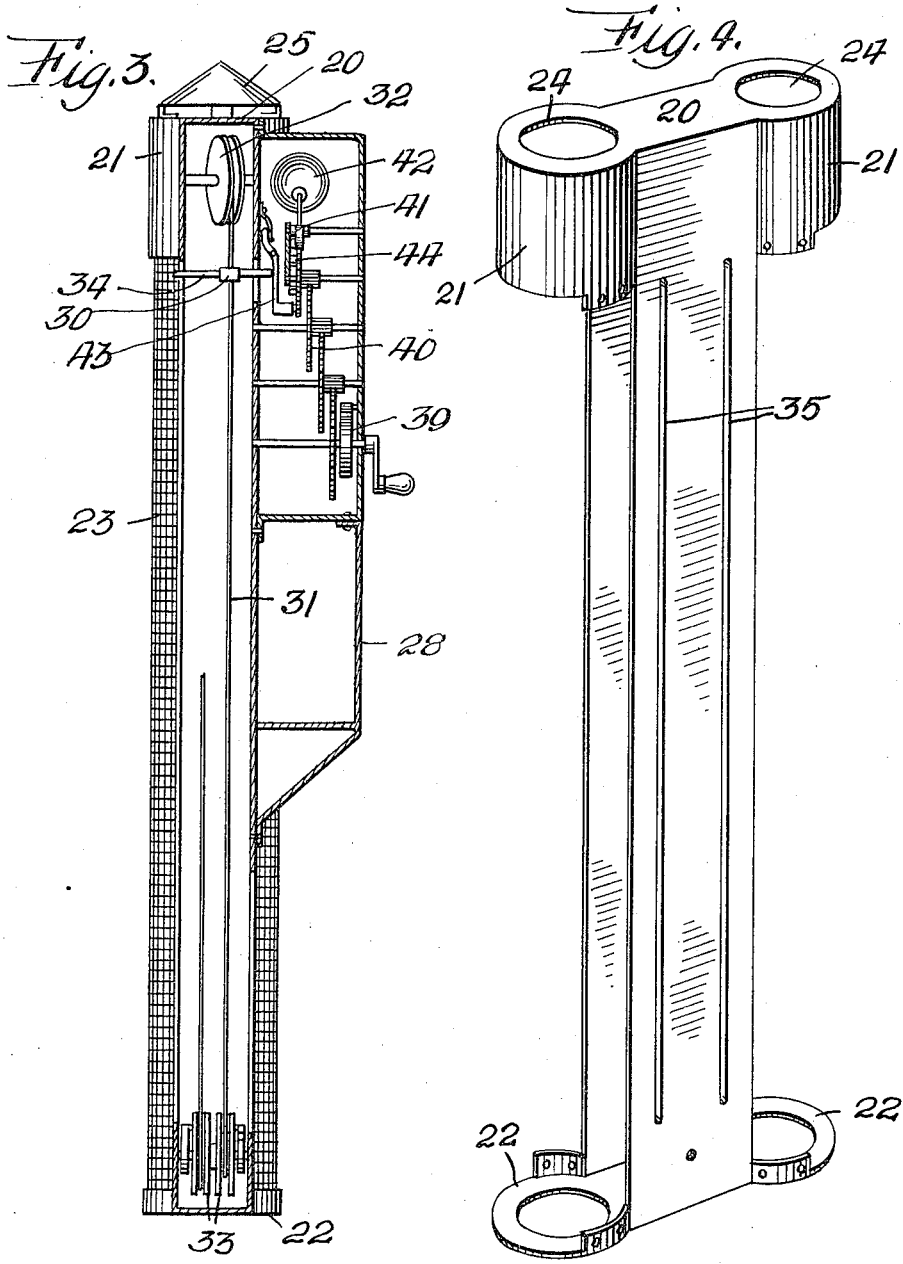

A. SZABODOS & H. MUELLER.
INDICATING AND ALARM MECHANISM FOR THE MOVEMENTS OF GASES IN MINES.
APPLICATION FILED JAN. 9, 1912.
1,064,869.
Patented June 17, 1913.
4 SHEETS—SHEET 3.
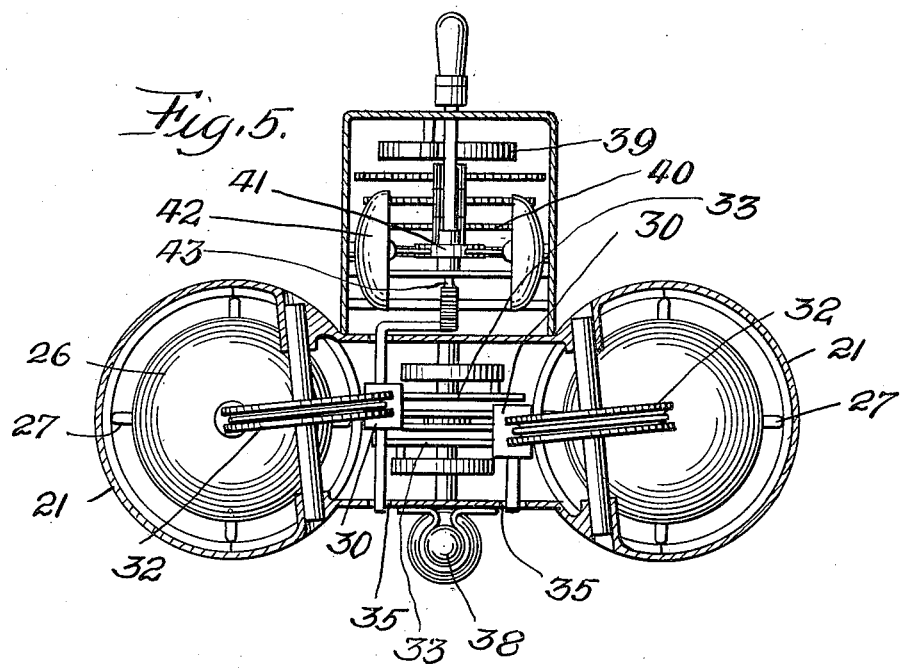
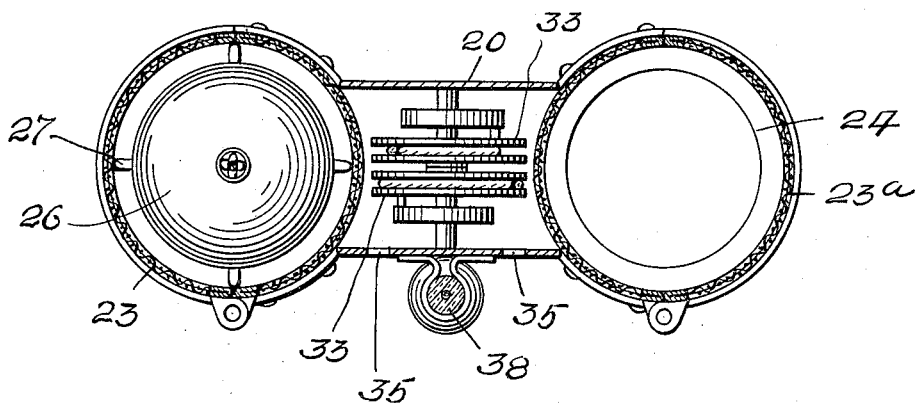

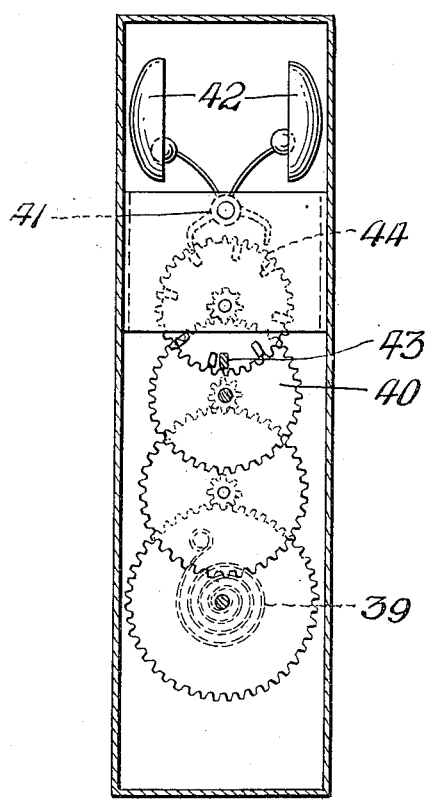
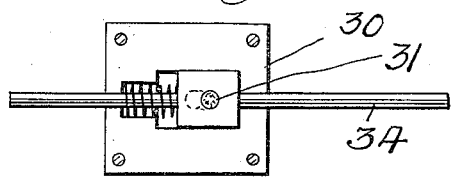
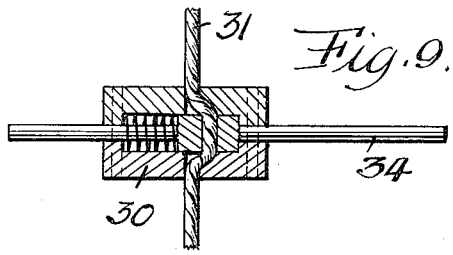
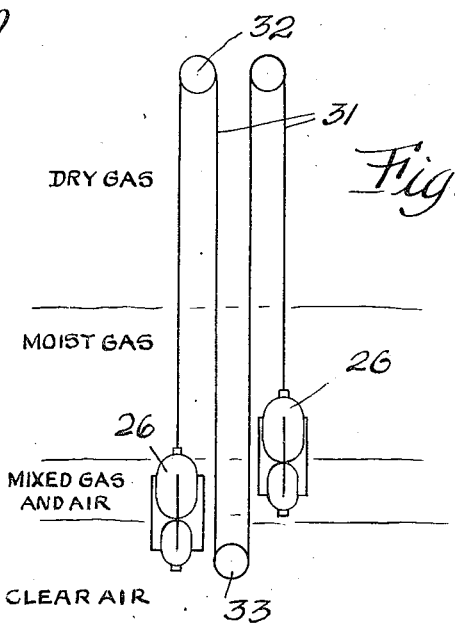
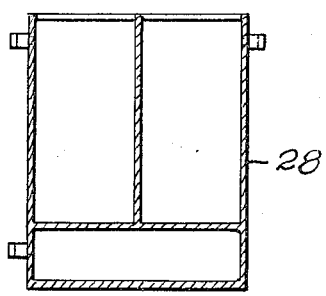

UNITED STATES PATENT OFFICE.

ANTONY SZABODOS AND HELLENA MUELLER, OF NEW MICHEL, BRITISH COLUMBIA, CANADA.

INDICATING AND ALARM MECHANISM FOR THE MOVEMENTS OF GASES IN MINES.

1,064,869.

Specification of Letters Patent.

Patented June 17, 1913.

Application filed January 9, 1912. Serial No. 670,256.

To all whom it may concern:

Be it known that we, ANTONY SZABODOS and HELLENA MUELLER, subjects of the King of Hungary, residing at New Michel, Province of British Columbia, Dominion of Canada, have invented certain new and useful Improvements in Indicating and Alarm Mechanism for the Movements of Gases in Mines, of which the following is a specification, reference being had therein to the accompanying drawings.

Our invention relates to improvements in indicating and alarm mechanism for the movements of gases in mines, and has for its principal object the provision of means which will visually indicate the approximate location of the stratum located between the clear air and the moist gas present in mines and other places, which stratum comprises a mixture of these two elements, this indication following the movements of the stratum vertically, and also providing a signal which will be operated when this stratum passes to a position where it may be dangerous to the miner.

A further object of the invention is to provide a device of this character so constructed as to require the use of no material which would tend to cause explosion; also to eliminate all requirements for chemical action as a basis for the operation of the indicator.

Further objects are to provide a construction which is simple and efficient in operation, sensitive to changes, which will provide for accurate indications, which is compact, and which can be manufactured and installed at a relatively low cost.

To these and other ends, the nature of which will be readily understood as the invention is hereinafter disclosed, our invention consists in the improved construction and combination of parts hereinafter fully described, illustrated in the accompanying drawings, and particularly pointed out in the appended claims.

In the drawing, in which similar reference characters indicate corresponding parts in each of the views, Figure 1 is a front elevation of a device constructed in accordance with our invention; Fig. 2 is a central longitudinal vertical sectional view of the same; Fig. 3 is a vertical sectional view taken on the line of III—III of Fig. 1; Fig. 4 is a detail view of the frame which supports the cage structure and to which the remaining parts are connected; Fig. 5 is a cross sectional view taken on the line V—V of Fig. 1; Fig. 6 is a similar view taken on the line VI—VI of Fig. 1; Fig. 7 is a detail view partly in section and partly in elevation showing the general arrangement of the alarm mechanism; Fig. 8 is a plan view of one of the adjustable indicating devices; Fig. 9 is a vertical section of the same; Fig. 10 is a diagrammatic view showing the position of parts in the operation of the device; Fig. 11 is a detail sectional view showing the carrier forming the supply for the gases or other elements used in connection with the floats.

In mining operations it is substantially the universal finding that there is practically a fixed relationship of air and gases which is substantially constant, excepting that the volume may vary, the elements being generally in the form of strata, a diagrammatic representation of which is shown in Fig. 10; the relative arrangement or relationship of these elements is, reading upwardly (disregarding the question of fire damp or black damp which may be present in a form so diluted with air as to be ordinarily non-explosive or may not be present in any form, and with which the present invention does not deal), in the following order: clear air, a mixture of the air and moist gas in a zone between the two, the moist gas, and the dry gas, these strata being indicated in Fig. 10. The exact depth of each strata may vary according to conditions, but these variations do not materially affect the mining operation, so far as personal safety is concerned, excepting where the variation causes the depth of the clear air stratum to be decreased to such an extent as to cause the moist gas to pass to a position where it will be liable to affect the miner. As there is always a stratum which is practically a mixture of the pure air and the moist gas between the clear air proper and the moist gas proper, it will be clear that if visual indication or alarm mechanism be employed which will give an accurate location of this particular stratum, sufficient warning will be given to permit miners to reach a place of safety. In view of the fact that these strata are provided by the relative weight of the elements comprising the strata, the clear air being heavier, it will be readily understood that by the employment of mechanism which will have the effect of placing a float structure so that it will ride at a point corresponding to the upper bounds of the clear air stratum, and connecting this float structure to an indicating mechanism and an alarm mechanism, variations in position of this line will be indicated by the movements of the float; similarly the opposite boundary of the mixed air and gas stratum may be indicated by a similar float, thereby providing for a visual indication of the location and the width or depth of the zone between the air and gas proper. It is this particular type of mechanism and operation which forms the subject matter of the present invention.

20 designates a support, shown more particularly in Fig. 4, which carries the remaining portions of the apparatus, this support having at its top spaced-apart caps 21, which, in connection with opposing cap structures 22 located at the bottom of the support serve to retain in position two cages 23 and 23ª, these cages being preferably formed in two parts, one of which is fixedly secured to the support, while the other is in the form of a structure hinged thereto and acting in the nature of a door, said parts preferably forming a cage cylindrical in cross section, although any other particular cross sectional configuration may be employed. Each cage structure is preferably formed of gauze or other metallic woven fabric to permit of a maximum amount of exposure of the interior of the cage to the surrounding conditions, the caps 21 and cap structures 22 being preferably provided with openings 24, to facilitate this effect, the openings in the caps 21 being preferably protected against weather conditions by hood structures 25. This particular arrangement of parts provides for two spaced-apart vertical shafts within which the float structures presently described are adapted to move, the space between these shafts being used for the purpose of housing the indicating mechanism and the tripping mechanism for the alarm.

The float structures, best shown in Fig. 2, preferably comprise two shell structures 26, of suitable material, and preferably connected to move in unison by suitable connections 27. The material of which the shells 26 are formed is such as to provide for maximum strength with minimum weight, the shells being intended to receive suitable gases or gas mixtures, either free or under compression for the purpose of providing a proper balance of the float structure on the line which divides the particular strata. As will be obvious, the contents of the shells must be such as to provide the location result, the purpose being to provide a sufficient sustaining action to prevent a float from sinking into the clear air stratum, or to rise into the mixture stratum beyond the normal position of the shells in the two strata, where the float is intended to indicate the approximate level of the clear air. For this purpose any suitable gas or combination of gases may be employed. For instance, the lower shell at the left of Fig. 2 may contain a mixture of air and gas, such as hydrogen, the latter being sufficient to balance the weight of the container or shell, while the upper shell may contain hydrogen or other gas which is sufficient to counteract the weight of the container, but insufficient to cause the container to rise within the stratum. As will be readily understood, when the containers or shells have been properly balanced to cause them to maintain a practically fixed relationship with the upper bounds of the stratum, the float will remain substantially stationary excepting when such bounds change their position either upwardly or downwardly, such changes of course affecting the support afforded by the surrounding conditions, and consequently permitting the float to move accordingly to regain its normal relationship with the strata. For the purpose of charging the shells or containers, each is provided with an inlet port which is valve-controlled, and by means of which the contents may be readily changed to meet conditions. To provide for this, we may employ a container for the different gases and compressed air, such as shown more particularly at 28 in Fig. 11, which discloses a compartment structure which has inlet and outlet controlling devices and also is preferably provided with a flexible connection which can be detachably connected to the proper float at will. Obviously, suitable gage structures can be employed in connection with this structure. The floats 26 may, if desired, be used as the indicating means, but we prefer to employ in connection therewith a suitable indicating mechanism which consists in the use of an indicating number 30, shown more particularly in Figs. 8 and 9, mounted on a suitable cord or other structure 31, said cord extending over a sheave or pulley 32 above the shafts, said cord having one end secured to the upper portion of the float and having the other end adapted to be mounted upon a suitable take-up device which may be in the form of a spring-actuated pulley 33, the tension of the spring being sufficient only to take up any slack which may be provided in the cord or cable 31, but which will not be sufficient to affect the movement of the float in the opposite direction in which the take-up device is unwound. Each float is provided with an independent take-up device, although, if desired, the floats may be connected to move in unison positively, the separate structure, however, being preferred, since both floats necessarily move in the same direction when there is any material movement in the device.

The indicators shown in Figs. 8 and 9 are preferably in the form of a housing within which is mounted a spring plunger through which the cord or cable extends, the construction being such that under normal conditions, the member will have a fixed position on the cord or cable, due to the particular arrangement, as indicated in Fig. 9. The housing for this member may be formed in suitable manner, that shown in the drawings being to provide a casing formed in two parts being divided centrally in a horizontal plane, thereby permitting of a ready assemblage of the parts. This particular arrangement is provided for the purpose of permitting adjustments of the indicator on the cord or cable. For instance, the strata are subject to variations in heat conditions; where the change is to any material extent, the balanced effect of the float is varied so that the normal condition or position of the float would change and change the indicators, when in actual fact the changed positions do not affect the normal location of the strata bounds. Under these conditions the indicator is adjusted on the cord or cable to take up for these variations, after which the movements are as before with the exception that the length of cable between the indicator and the float has been varied. This is of especial importance since the indicator, which includes the finger 34 projecting through an elongated slot 35 in the support 20, operates in connection with a fixed scale, indicated at 37, this scale acting as a guide in determining the relative positions of the strata.

As will be seen by reference to Fig. 10, the width of the stratum of mixed air and gas is the distance between the planes which pass between the two shells or containers of each float. Obviously, should the width of this zone increase, each float being separately controlled, would be subject to movement according to which direction the increase was had, while a decrease would operate in the opposite manner to decrease the distance between these planes. The markings on the scale 37 are of any desired type suitable for the purpose, being intended more particularly to show distances which may be traversed by the indicating member. For instance, the scale on the left in Fig. 1 is intended to provide for indications of clear air, it being readily understood that as the upper bound of the clear air moves upwardly, the float at the left in Fig. 2 will move correspondingly and thus permit the take-up device to move the indicator 30 downwardly, which movement would be indicated on the scale at the left by shifting from an upper portion of the slot to a lower one and indicating a greater degree of safety. On the contrary the float at the right in Fig. 2 is intended to indicate the movements of the lower bounds of the moist gas, and as the danger increases by reason of the downward movement of the lower boundary of the stratum, this indicator will be moved upwardly by the downward movement of the float at the right and thus indicate the danger point. For the purpose of indicating the temperature, we may provide a thermometer 38; this will, in addition to serving its ordinary purposes, enable the operator to determine just where the indicating members should be placed, since it is intended that fixed instructions will be given in this respect to be followed in connection with changes in temperature.

In addition to the indicating features just described, we provide an alarm device which will operate automatically at the desired time when the conditions surrounding the device indicate the approach of danger. This device is preferably in the form of a spring motor operating through a train of gearing and escapement pawl which carries one or more tappers for one or more gongs, the general construction being indicated conventionally in Fig. 7, the motor being indicated at 39, the train of gearing at 40, the escapement device at 41, and the gongs at 42. The train of gearing is held normally inactive by the use of a trip lever 43, which, by a suitable means, such as a light spring, places an obstruction in the path of teeth 44 carried by the escapement wheel, said lever extending into the path of movement of the indicating member for the clear air, the movement of said indicating member to a position where it will move the trip lever out of its locking position, releasing the train of gearing and permitting the spring motor to begin operation to sound the alarm. Since it is desirable that this sounding or alarming take place upon the approach of the danger, we preferably employ the indicator for the clear air for this purpose, since variations in the thickness or width of the mixed zone will not affect the operation of the alarm.

As will be readily understood, the principles of operation of the present device are based more particularly on positive movements of the strata in a vertical direction, these strata movements being due to the increased or decreased amount of gas contained in the mine, taking up for variations in movements and positions with certainty and providing for an exceedingly sensitive indicator which is positive in its action.

We have herein disclosed a preferred way in which our invention may be carried out, but it will be obvious that many and varied changes and modifications therein may be made, such for instance as the change in form and proportion of parts or the use of different types of individual mechanism, these changes and modifications, however, not affecting the general principles underlying the present invention, and we desire it to be understood that we reserve the right to make any and all such changes and modifications as may be found desirable or necessary in so far as they may fall within the spirit and scope of the invention and its underlying principles as expressed in the accompanying claims.

Having thus described our invention, what we claim as new is:

1. In a device of the character described, a support having a vertical shaft extending into adjacent strata of air or gas or a mixture thereof, a float mounted to move longitudinally of said shaft and supported by said adjacent strata to indicate the boundary therebetween, a take-up device, a connection between said device and said float, an indicating member mounted on said connection and adapted to move in correspondence with the movements of said float, and alarm mechanism mounted in the path of said indicating member and adapted to be tripped at a predetermined point in the length of movement of said member.

2. In a device of the character described, a vertical shaft open to atmospheric pressure, and a float mounted in said shaft, said float comprising connected shells or containers movable in similar directions as a unit and having contents adapted to support the float at a predetermined position with respect to particular strata, said float being adjustable as to specific gravity and free to move in correspondence with the vertical movements of such stratum.

3. In a device of the character described, a pair of vertical shafts, a float in each shaft, each float being capable of adjustment as to specific gravity, said floats being movable independently of each other and having different flotation qualities to permit them to combinedly indicate the opposite boundaries of a predetermined stratum or zone.

4. In a device of the character described, a pair of vertical shafts, a float in each shaft, each float being capable of adjustment as to specific gravity, said floats being movable independently of each other and having different flotation qualities to permit them to combinedly indicate the opposite boundaries of a predetermined stratum or zone, and an independent indicating member movable in correspondence with the movements of each float.

5. In a device of the character described, a pair of vertical shafts, a float in each shaft, each float being capable of adjustment as to specific gravity, said floats being movable independently of each other and having different flotation qualities to permit them to combinedly indicate the opposite boundaries of a predetermined stratum or zone, an independent indicating member movable in correspondence with the movements of each float, and alarm mechanism operative by the movements of one of said members.

In testimony whereof we have respectively affixed our signatures in presence of tw witnesses.

ANTONY SZABODOS.
HELLENA MUELLER.

Witnesses for Szabodos:
 Max H. Srolovitz,
 A. Kennedy.
Witnesses for Mueller:
 M. Gorman,
 J. P. Appleman.

---

Copies of this patent may be obtained for five cents each, by addressing the "Commissioner of Patents, Washington, D. C."